(12) United States Patent
Shi et al.

(10) Patent No.: US 12,332,148 B2
(45) Date of Patent: Jun. 17, 2025

(54) DEVICE FOR MEASURING AND PROTECTING HORIZONTAL SLIDE TABLE DISPLACEMENT

(71) Applicant: SUZHOU SUSHI TESTING GROUP CO., LTD., Suzhou (CN)

(72) Inventors: Qiang Shi, Suzhou (CN); Pengfei Ge, Suzhou (CN)

(73) Assignee: SUZHOU SUSHI TESTING GROUP CO., LTD., Suzhou (CN)

(*) Notice: Subject to any disclaimer, the term of this patent is extended or adjusted under 35 U.S.C. 154(b) by 357 days.

(21) Appl. No.: 17/770,604

(22) PCT Filed: Nov. 27, 2019

(86) PCT No.: PCT/CN2019/121213
§ 371 (c)(1),
(2) Date: Apr. 20, 2022

(87) PCT Pub. No.: WO2021/088155
PCT Pub. Date: May 14, 2021

(65) Prior Publication Data
US 2022/0373428 A1 Nov. 24, 2022

(30) Foreign Application Priority Data
Nov. 7, 2019 (CN) .......................... 201911080181.2

(51) Int. Cl.
*G01M 7/02* (2006.01)
*G01B 21/02* (2006.01)
(52) U.S. Cl.
CPC ............ *G01M 7/022* (2013.01); *G01M 7/025* (2013.01)

(58) Field of Classification Search
CPC ...... G01M 7/022; G01M 7/025; G01B 21/02; G01B 11/02; G01B 21/00; G01B 5/0002;
(Continued)

(56) References Cited

U.S. PATENT DOCUMENTS

| 5,737,239 A | 4/1998 | Horiuchi et al. |
| 2018/0003225 A1* | 1/2018 | Zheng ................. F16C 32/0659 |

FOREIGN PATENT DOCUMENTS

| CN | 200985955 Y | * 12/2007 |
| CN | 101498615 A | 8/2009 |

(Continued)

OTHER PUBLICATIONS

Translation of CN 200985955 Y (Year: 2007).*
(Continued)

*Primary Examiner* — Laura Martin
*Assistant Examiner* — Anthony W Megna Fuentes
(74) *Attorney, Agent, or Firm* — Cheng-Ju Chiang (57) ABSTRACT

A device for measuring and protecting a horizontal slide table displacement, includes: a displacement detected assembly, a displacement detection assembly and a vibration controller, wherein the displacement detected assembly vibrates synchronously with a horizontal slide table top, the displacement detection assembly is configured to measure a displacement value of the displacement detected assembly and transmit the displacement value to the vibration controller, and the vibration controller is used to control the horizontal slide table to vibrate or stop vibrating. The device can achieve the limitation and protection of the horizontal slide table displacement; and the device may be flexibly mounted on the horizontal slide table, and has characteristics such as convenient installation and simple use.

9 Claims, 6 Drawing Sheets

(58) Field of Classification Search
CPC .......... G01B 11/24; G01B 21/16; G01B 5/00;
G01B 11/14; G01B 7/02; G01B 21/22;
G01B 11/30; G01B 11/08; G01B 5/201;
G01B 21/10; G01B 7/12; G01B 11/026;
G01B 7/003; G01N 3/02; G01N
2203/0682; G01N 2035/0491
USPC .......................................................... 73/663
See application file for complete search history.

(56) References Cited

FOREIGN PATENT DOCUMENTS

| | | | | | |
|---|---|---|---|---|---|
| CN | 201314858 | Y | | 9/2009 | |
| CN | 201364499 | Y | | 12/2009 | |
| CN | 105241627 | A | * | 1/2016 | |
| CN | 206095564 | U | | 4/2017 | |
| CN | 107796582 | A | | 3/2018 | |
| CN | 107991048 | A | | 5/2018 | |
| CN | 207585868 | U | | 7/2018 | |
| CN | 209417311 | U | * | 9/2019 | |
| CN | 210922550 | U | | 7/2020 | |
| JP | 2019002731 | A | * | 1/2019 | |
| WO | WO-9321510 | A1 | * | 10/1993 | ............. G01M 7/06 |

OTHER PUBLICATIONS

Translation of CN 105241627 A (Year: 2016).*
Translation of CN 209417311 U (Year: 2019).*
Translation of JP 2019002731 (Year: 2019).*

* cited by examiner

DEVICE FOR MEASURING AND PROTECTING HORIZONTAL SLIDE TABLE DISPLACEMENT

CROSS REFERENCE TO RELATED APPLICATIONS

The present application is a 35 U.S.C. § 371 National Phase conversion of International (PCT) Patent Application No. PCT/CN2019/121213, filed on Nov. 27, 2019, which claims priority to Chinese Patent Application No. 201911080181.2, filed with the China National Intellectual Property Administration on Nov. 7, 2019 and entitled "Device for Measuring and Protecting Horizontal Slide Table Displacement", the content of which is incorporated herein by reference in its entirety. The PCT International Patent Application was filed and published in Chinese.

TECHNICAL FIELD

The present invention relates to the technical field of a vibration table, and particularly to a device for measuring and protecting a horizontal slide table displacement.

BACKGROUND

Figure 1:
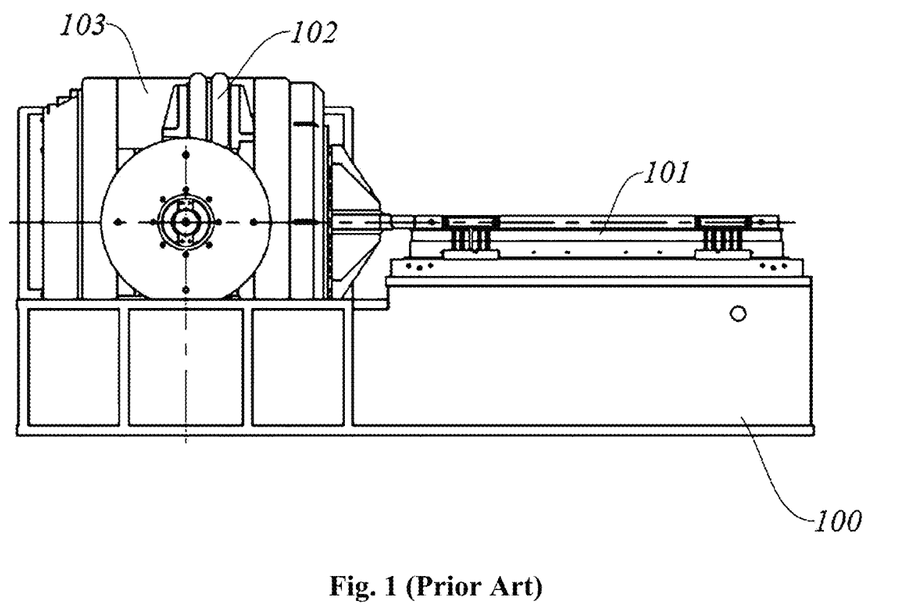
FIG. 1 is a schematic view of a conventional vibration table.

A vibration table shown in FIG. 1 comprises a horizontal slide table 101, a trunnion vibration isolation mechanism 102, and an exciter 103 mounted on a vibration table base 100, wherein the horizontal slide table 101 is an important component for implementing a horizontal vibration test. The conventional horizontal slide tables are all not provided with a displacement measuring and protecting device, and only rely on an eddy current sensor in the vibration tables to achieve the measurement and protection of moving parts of the vibration table.

The trunnion vibration isolation mechanism 102 of the electric vibration table has characteristics such as a large carrying capacity and good structural rigidity, and also has a position-adjusting function in a static state. Furthermore, the trunnion vibration isolation mechanism 102 may substantially reduce the vibration transmitted to the vibration table base 100 when the table body operates, and reduce the impact to peripheral devices and infrastructure facilities around the foundation of the vibration table. However, due to the action of the trunnion vibration isolation mechanism 102, an actual displacement of a table top of the horizontal slide table 101 when the vibration table vibrates horizontally will be greater than a vibration displacement of the vibration table (the exciter 103 and the horizontal slide table 101 of the electric vibration table are both mounted on the vibration table base 100, and the exciter 103, upon operation of the vibration table, causes a certain vibration displacement under the action of the trunnion vibration isolation mechanism 102, which in turn causes the actual displacement of the table top of the horizontal slide table 101 to be a sum of a moving coil displacement of the exciter 103 and the displacement caused by the exciter 103 due to the trunnion vibration isolation mechanism). When a maximum displacement horizontal vibration test is performed, failure or damage might be caused to the horizontal slide table.

For the above reasons, a device for measuring and protecting the horizontal slide table displacement is proposed purposefully.

SUMMARY

A main technical problem solved by the present invention is to provide a device for measuring and protecting a horizontal slide table displacement, which may measure an absolute vibration displacement value of the horizontal slide table top in real time and transmit a measurement result to a vibration controller, and control the start and stop of the vibration table through the vibration controller, thereby achieving the protection of the horizontal slide table displacement.

In order to solve the above technical problem, the present invention employs the following technical solution: there is provided a device for measuring and protecting a horizontal slide table displacement, comprising: a displacement detection assembly, a displacement detected assembly and a vibration controller, wherein the displacement detected assembly vibrates synchronously with a horizontal slide table top, the displacement detection assembly is configured to measure a displacement value of the displacement detected assembly and transmit the displacement value to the vibration controller, and the vibration controller controls the vibration table to stop vibrating when the displacement value exceeds a preset limit value in the vibration controller.

In a preferred embodiment of the present invention, the displacement detected assembly comprises: a displacement detection ring mounting block, a displacement detection ring and a retaining ring, the displacement detection ring mounting block is fixedly connected to the horizontal slide table top, and the retaining ring is used to fix the displacement detection ring on the displacement detection mounting block;

the displacement detection assembly comprises a displacement sensor mounting frame and a displacement sensor, the displacement sensor mounting frame is fixedly mounted on a horizontal slide table bottom plate or on a horizontal slide table oil tank or on a vibration table base, the displacement sensor is fixed on the displacement sensor mounting frame, and a sensing rod of the displacement sensor penetrates the displacement detection ring and remains coaxial with the displacement detection ring.

In a preferred embodiment of the present invention, the displacement detection ring mounting block is provided with a cavity on an end face of the displacement detection assembly, a center of the cavity is provided with a through hole running through to the other end face of the displacement detection ring mounting block, and the retaining ring is pressed on the displacement detection ring and the displacement detection ring is limited and fixed at a bottom of the cavity via screws.

In order to solve the above technical problems, another technical solution employed by the present invention is to provide a vibration table, including a horizontal slide table mounted on the vibration table base, a trunnion vibration isolation mechanism, an exciter, and the device for measuring and protecting a horizontal slide table displacement mounted on the horizontal slide table.

In a preferred embodiment of the present invention, the horizontal slide table is a T-shaped guide rail slide table or a V-shaped guide rail slide table or a self-lubricating guide rail slide table.

In a preferred embodiment of the present invention, the device for measuring and protecting a horizontal slide table displacement is mounted on an end face of the T-shaped guide rail slide table.

In a preferred embodiment of the present invention, the device for measuring and protecting a horizontal slide table displacement is mounted on a side surface of the T-shaped guide rail slide table.

In a preferred embodiment of the present invention, the device for measuring and protecting a horizontal slide table displacement is mounted on an end face of the V-shaped guide rail slide table.

In a preferred embodiment of the present invention, the device for measuring and protecting a horizontal slide table displacement is mounted on a side surface of the V-shaped guide rail slide table.

In a preferred embodiment of the present invention, the device for measuring and protecting a horizontal slide table displacement is mounted under a table top of the self-lubricating guide rail slide table.

Advantageous effects of the present invention are as follows: the device for measuring and protecting a horizontal slide table displacement according to the present invention is used to perform real-time measurement of an absolute vibration displacement value of the horizontal slide table of the vibration table, and transmits the measured vibration displacement value to the vibration controller; the vibration controller judges whether the vibration displacement value exceeds a preset limit value therein, and the vibration controller controls the vibration table to stop vibrating when the vibration displacement value exceeds the preset limit value, thereby achieving the limitation and protection of the horizontal slide table displacement; furthermore, the device for measuring and protecting a horizontal slide table displacement according to the present invention may be flexibly mounted on the horizontal slide table, and has characteristics such as convenient installation and simple use.

The parts in the figures denoted by the following reference numbers are as follows: 1 displacement detected assembly, 11 displacement detection ring, 12 displacement detection ring mounting block, 13 retaining ring, 121 cavity, 1211 through hole; 2 displacement detection assembly, 21 displacement sensor, 22 displacement sensor mounting frame; 3 screw; 100 vibration table base, 101 horizontal slide table, 102 trunnion vibration isolation mechanism, 103 exciter, 1011 horizontal slide table top, 1012 horizontal slide table bottom plate, 1013 horizontal slide table oil tank.

DETAILED DESCRIPTION

Preferred embodiments of the present invention will be illustrated in detail with reference to the figures to make advantages and features of the present invention more apparent to those skilled in the art, thereby defining the protection scope of the present invention more clearly and definitely.

Referring to FIG. 2 through FIG. 11B, the present invention comprises:

A device for measuring and protecting a horizontal slide table displacement, comprising: a displacement detected assembly 1, a displacement detection assembly 2 and a vibration controller. The displacement detected assembly 1 is mounted on a horizontal slide table top 1011 and vibrates synchronously with the horizontal slide table top 1011. The displacement detection assembly 2 is mounted on a horizontal slide table bottom plate 1012 or a horizontal slide table oil tank 1013 or a vibration table base 100 and configured to measure a displacement value of the displacement detected assembly 1 and transmit the displacement value to the vibration controller. When the displacement value exceeds a preset limit value in the vibration controller, the vibration controller controls the vibration table to stop vibrating.

The displacement detected assembly 1 comprises: a displacement detection ring mounting block 12, a displacement detection ring 11 and a retaining ring 13, wherein the displacement detection ring mounting block 12 is fixedly connected to the horizontal slide table top 1011, and the retaining ring 13 is used to limit and fix the displacement detection ring 11 on the displacement detection mounting block 12; specifically, the displacement detection ring mounting block 12 is provided with a cavity 121 on an end face close to the displacement detection assembly 2, a center of the cavity 121 is provided with a through hole 1211 running through to the other end face of the displacement detection ring mounting block 12, and the retaining ring 13 is pressed on the displacement detection ring 11 and the displacement detection ring 11 is limited and fixed at a bottom of the cavity 121 via screws;

The displacement detection assembly 2 comprises a displacement sensor mounting frame 22 and a displacement sensor 21. A lower end of the displacement sensor mounting frame 22 is fixedly mounted on the horizontal slide table bottom plate 1012 or the horizontal slide table oil tank 1013 or the vibration table base 100. The displacement sensor 21 is fixed on an upper end of the displacement sensor mounting frame 22, and a sensing rod of the displacement sensor 21 penetrates the displacement detection ring 11 and extends into the through hole 1211. When the displacement detection ring 11 vibrates along with the horizontal slide table top 1011, the displacement sensor 21 can measure a relative displacement value of the two in real time. Since the displacement detection ring 11 and the sensing rod of the displacement sensor 21 remain coaxial and an inner diameter of the displacement detection ring 11 is greater than the diameter of the sensing rod, the displacement detection ring 11 and the sensing rod form a non-contact displacement measurement, which can ensure the reliability and stability of the displacement measurement.

The present invention ensures none interference when the device for measuring and protecting the horizontal slide table displacement moves peripherally only by disposing the device for measuring and protecting the horizontal slide table displacement on any surface of front and rear end faces and two side surfaces of the horizontal slide table without changing the structure of the device for measuring and protecting the horizontal slide table displacement. The real-time detection of the vibration displacement of the horizontal slide table top 1011 can be achieved by connecting a signal line of the displacement sensor 21 to the vibration controller. A limit value is preset in the vibration controller. When the measured displacement value exceeds the limit value, the device can be shut down in time for a protection purpose.

The displacement detected assembly 1 mounted on the horizontal slide table top 1011 of the present invention has a small mass, and has a smaller impact on a total weight of the moving parts of the vibration system, and therefore has a small impact on the maximum acceleration index of the system.

The device for measuring and protecting the horizontal slide table displacement can be widely applied to horizontal slide tables employing various types of guide rails. The application of the device of the present invention to the horizontal slide tables employing different guide rails will be further described below with reference to the figures:

Reference is made to FIG. 2 through FIG. 5B.

The device for measuring and protecting the horizontal slide table displacement may be mounted on any surface of rear and rear end faces and two side surfaces of a horizontal slide table employing a T-shaped guide rail.

Figure 2:
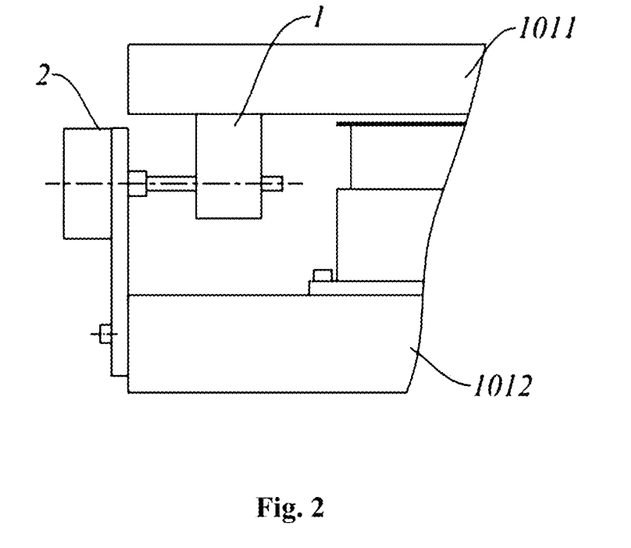
FIG. 2 is a schematic view showing a state in which a device according to the present invention is mounted on an end face of a T-shaped guide rail slide table.
Figure 3:
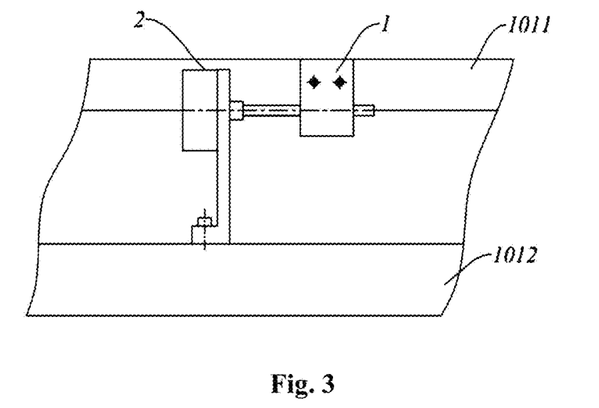
FIG. 3 is a schematic view showing a state in which the device according to the present invention is mounted on a side surface of a T-shaped guide rail slide table.
Figure 4A:
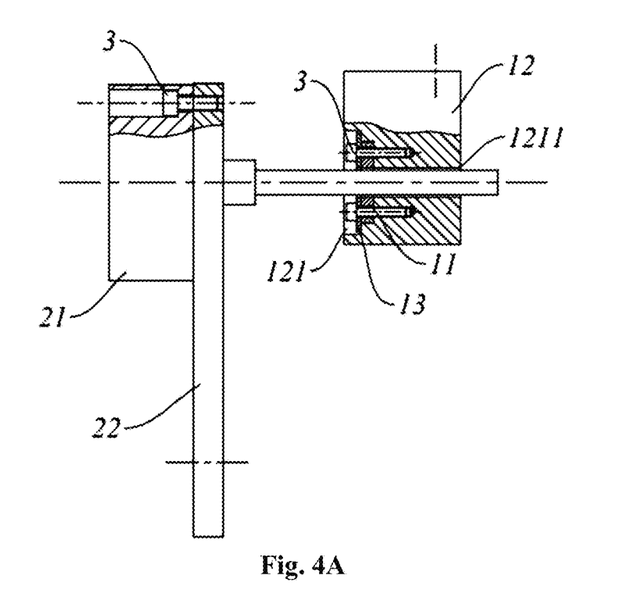
FIGS. 4A and 4B are schematic views of a device for measuring and protecting a horizontal slide table displacement when mounted on the end face of the T-shaped guide rail slide table.
Figure 4B:
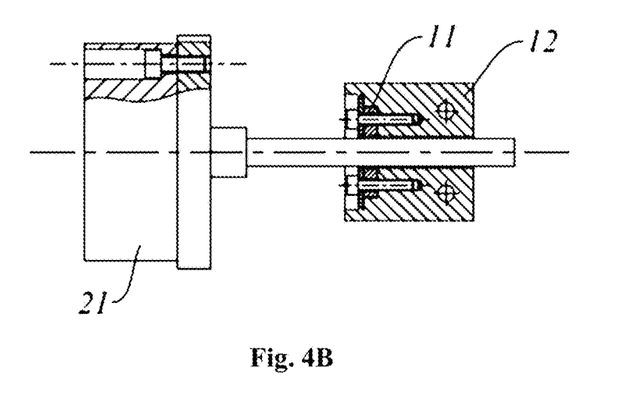
Figure 5A:
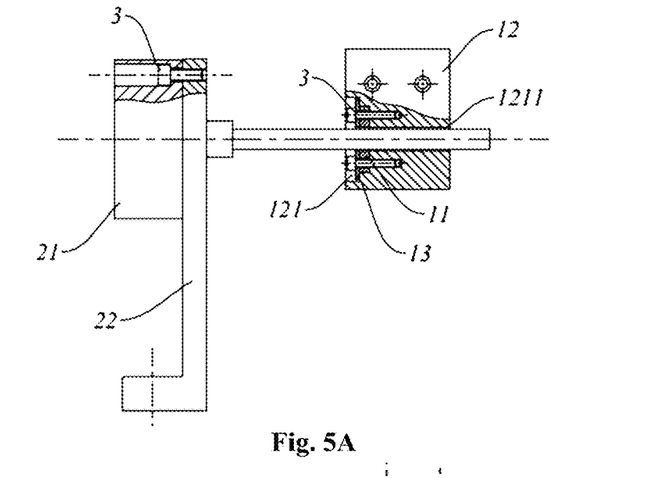
FIGS. 5A and 5B are schematic views of a device for measuring and protecting a horizontal slide table displacement when mounted on the side surface of the T-shaped guide rail slide table.
Figure 5B:
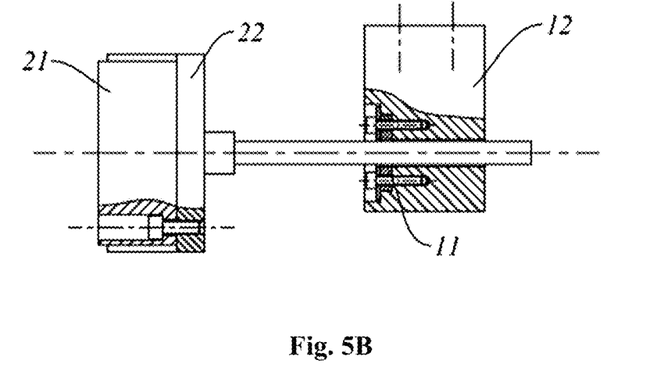

Further referring to FIG. 2 and FIG. 4B, the device for measuring and protecting the horizontal slide table displacement is mounted on an end face, the displacement detection assembly 1 is mounted on a lower end face of the horizontal slide table top 1011, the displacement sensor 21 is mounted on the displacement sensor mounting frame 22 and penetrates the displacement detection ring 11 in the displacement detection assembly 1 and keeps the sensing rod of the displacement sensor 21 and the displacement detection ring 11 coaxial. The displacement detection ring 11 keeps consistent with the vibration of the horizontal slide table top 1011, performs real-time measurement of the displacement of the horizontal slide table top 1011. A displacement signal is connected to the vibration controller, and the displacement of the horizontal slide table 101 is limited and protected by a limit value preset in a software in the vibration controller;

Then referring to FIG. 3 and FIG. 5B, the device for measuring and protecting the horizontal slide table displacement is mounted on a side surface, the displacement detection assembly 1 is mounted on a side surface of the horizontal slide table top 1011, and the displacement sensor mounting frame 22 is fixed on the horizontal slide table bottom plate 1012 or directly mounted on the vibration table base 100. Likewise, the displacement sensor 21 is mounted on the displacement sensor mounting frame 22 and penetrates the displacement detection ring 11 in the displacement detection assembly 1 and keeps the sensing rod of the displacement sensor 21 and the displacement detection ring 11 coaxial. The displacement detection ring 11 keeps consistent with the vibration of the horizontal slide table top 1011, performs real-time measurement of the displacement of the horizontal slide table top 1011. A displacement signal is connected to the vibration controller, and the displacement of the horizontal slide table 101 is limited and protected by a limit value preset in a software in the vibration controller.

Reference is made to FIG. 6 through FIG. 9B.

The device for measuring and protecting the horizontal slide table displacement may be mounted on any surface of rear and rear end faces and two side surfaces of a horizontal slide table employing a V-shaped guide rail.

Figure 6:
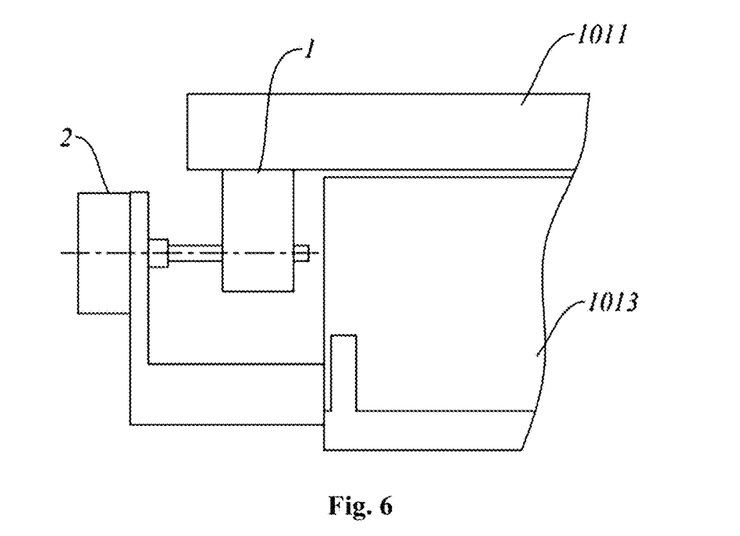
FIG. 6 is a schematic view showing a state in which the device according to the present invention is mounted on an end face of a V-shaped guide rail slide table.
Figure 7:
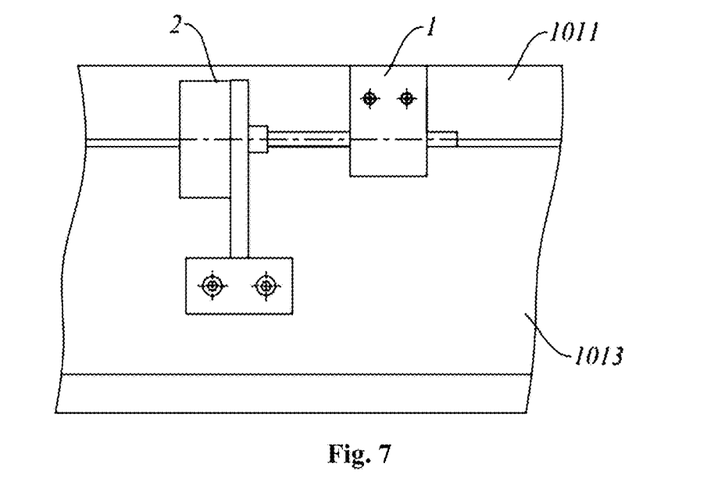
FIG. 7 is a schematic view showing a state in which the device according to the present invention is mounted on a side surface of a V-shaped guide rail slide table.
Figure 8A:
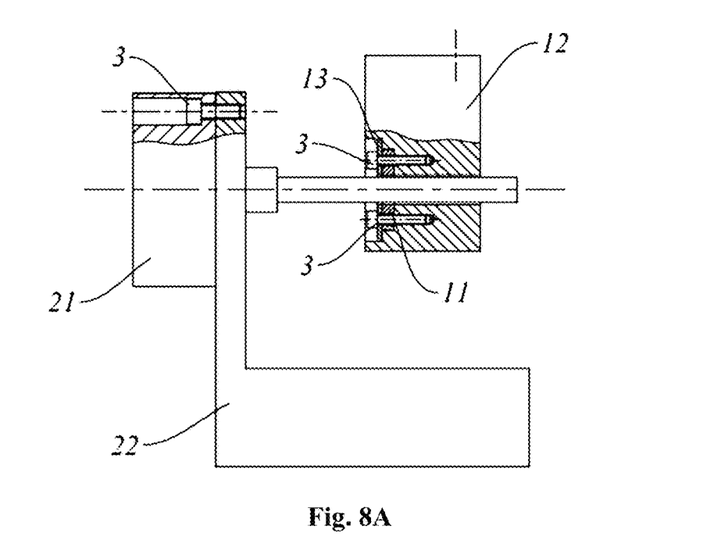
FIGS. 8A and 8B are schematic views of the device for measuring and protecting a horizontal slide table displacement when mounted on the end face of the V-shaped guide rail slide table.
Figure 8B:
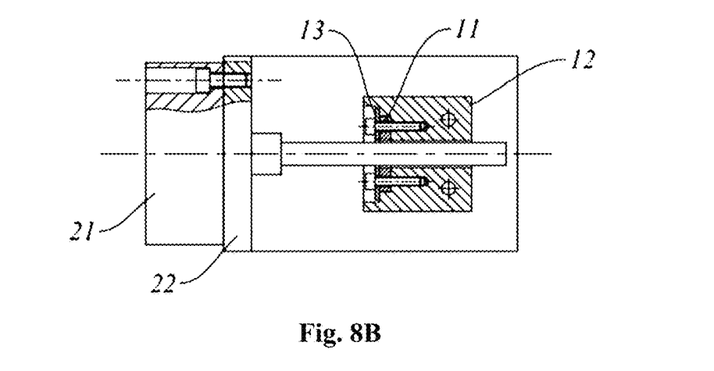
Figure 9A:
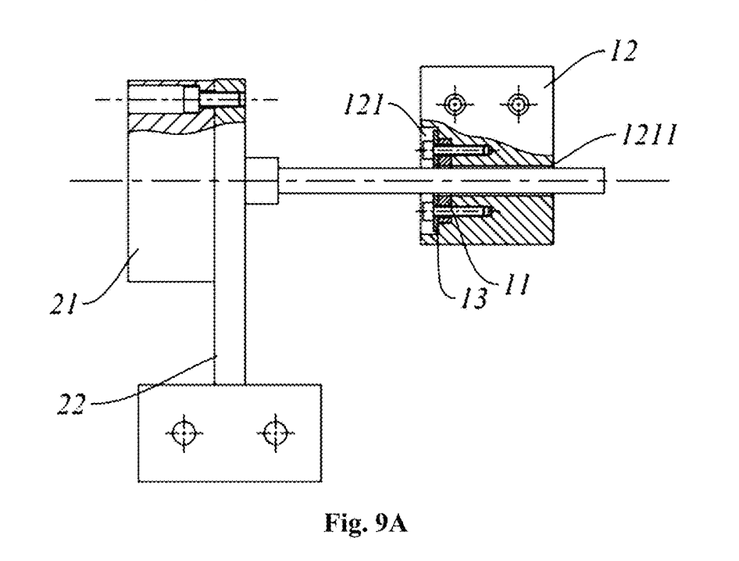
FIGS. 9A and 9B are schematic views of the device for measuring and protecting a horizontal slide table displacement when mounted on the side surface of the V-shaped guide rail slide table.
Figure 9B:
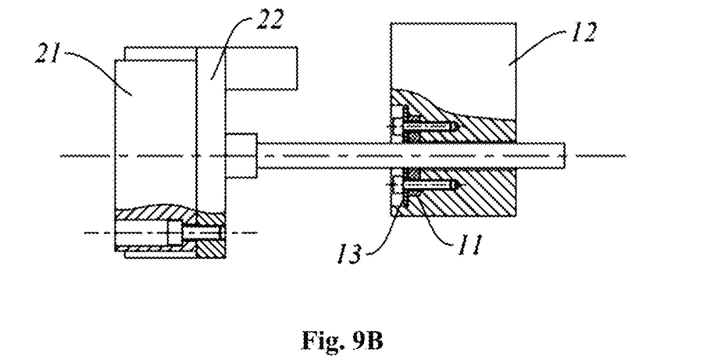

Further referring to FIG. 6 and FIG. 8B, the device for measuring and protecting the horizontal slide table displacement is mounted on an end face, the displacement detection assembly 1 is mounted on a lower end face of the horizontal slide table top 1011, and the displacement sensor mounting frame 22 is fixed on an end face of a horizontal slide table oil tank 1013. Likely, the displacement sensor 21 is mounted on the displacement sensor mounting frame 22 and penetrates the displacement detection ring 11 in the displacement detection assembly 1 and keeps the sensing rod of the displacement sensor 21 and the displacement detection ring 11 coaxial. The displacement detection ring 11 keeps consistent with the vibration of the horizontal slide table top 1011, performs real-time measurement of the displacement of the horizontal slide table top 1011. A displacement signal is connected to the vibration controller, and the displacement of the horizontal slide table 101 is limited and protected by a limit value preset in a software in the vibration controller;

Then referring to FIG. 7 and FIG. 9B, the device for measuring and protecting the horizontal slide table displacement is mounted on a side surface, the displacement detection assembly 1 is mounted on a side surface of the horizontal slide table top 1011, and the displacement sensor mounting frame 22 is fixed on a side surface of the horizontal slide table oil tank 1013. Likewise, the displacement sensor 21 is mounted on the displacement sensor mounting frame 22 and penetrates the displacement detection ring 11 in the displacement detection assembly 1 and keeps the sensing rod of the displacement sensor 21 and the displacement detection ring 11 coaxial. The displacement detection ring 11 keeps consistent with the vibration of the horizontal slide table top 1011, performs real-time measurement of the displacement of the horizontal slide table top 1011. A displacement signal is connected to the vibration controller, and the displacement of the horizontal slide table 101 is limited and protected by a limit value preset in a software in the vibration controller.

Figure 10:
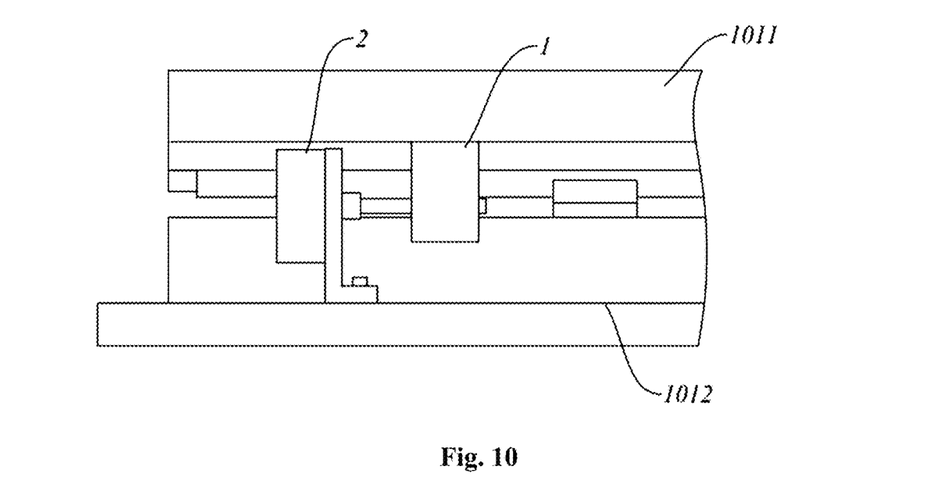
FIG. 10 is a schematic view showing a state in which the device according to the present invention is mounted on a self-lubricating guide rail slide table.
Figure 11A:
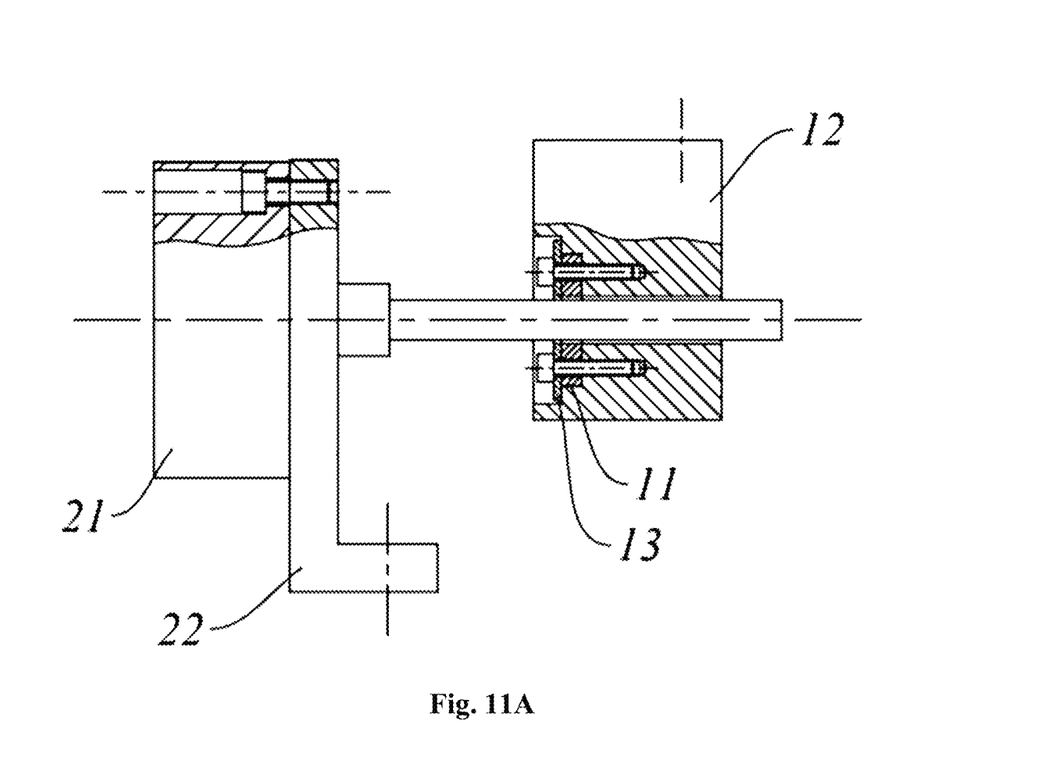
FIGS. 11A and 11B are schematic views of a device for measuring and protecting a horizontal slide table displacement when mounted on the self-lubricating guide rail slide table.
Figure 11B:
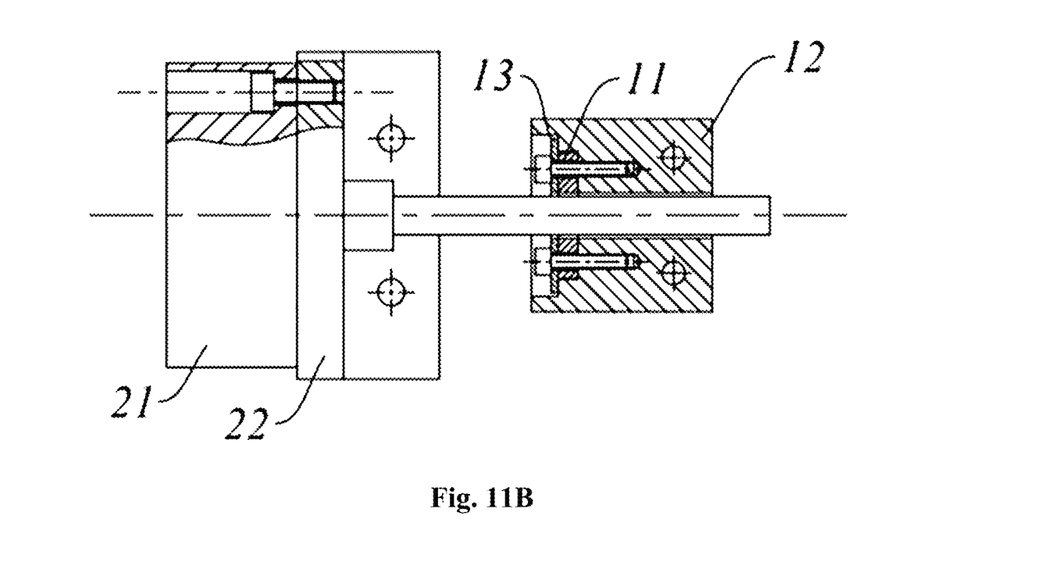

Reference is made to FIG. 10 through FIG. 11B.

A horizontal slide table having a self-lubricating guide rail is employed. Since the self-lubricating linear guide rail is small in size and the guide rail needn't be lubricated with a hydraulic oil, the device for measuring and protecting the horizontal slide table displacement can be flexibly mounted at any non-interference position under the horizontal slide table top 1011.

In the description of the present invention, it should be appreciated that the orientation or positional relationship indicated by terms such as "up", "down", "left", "right", "in" and "out" etc. is the orientation or positional relationship based on the drawings, or the orientation or positional relationship in which the product according to the present invention is customarily placed upon use, and does not indicate or imply that the specified means or elements must have a specific orientation and are constructed and operated with a specific orientation, and therefore cannot be construed as limiting the present invention. What are described above are only preferred embodiments of the present invention and are not used to limit the present invention. For those skilled in the art, the present invention may have various modifications and changes. Any modifications, equivalent replacements, improvements, etc. made within the spirit and principle of the present invention all should be included in the protection scope of the present invention.

What are described above are only embodiments of the present invention, and are not intended to limit the scope of the present invention. Any equivalent structure or equivalent process variations made by using the content of the description and drawings of the present invention, or direct or indirect applications to other related technical fields are likewise all included in the extent of protection of the present invention.

What is claimed is:

1. A device for measuring and protecting a horizontal slide table displacement, wherein the device comprises: a displacement detected assembly, a displacement detection assembly and a vibration controller, the displacement detected assembly vibrates synchronously with a horizontal slide table top, the displacement detection assembly is configured to measure a displacement value of the displacement detected assembly and transmit the displacement value to the vibration controller, and the vibration controller is used to control the horizontal slide table to vibrate or stop vibrating;

the displacement detected assembly comprises: a displacement detection ring mounting block, a displacement detection ring and a retaining ring, the displacement detection ring mounting block is fixedly connected to the horizontal slide table top, and the retaining ring is used to fix and limit the displacement detection ring on the displacement detection mounting block;

the displacement detection assembly comprises: a displacement sensor mounting frame and a displacement sensor, the displacement sensor mounting frame is fixedly mounted on a horizontal slide table bottom plate or on a horizontal slide table oil tank or on a vibration table base, the displacement sensor is fixed on the displacement sensor mounting frame, and a sensing rod of the displacement sensor penetrates the displacement detection ring and remains coaxial with the displacement detection ring.

2. The device for measuring and protecting a horizontal slide table displacement according to claim 1, wherein the displacement detection ring mounting block is provided with a cavity on an end face of the displacement detection assembly, a center of the cavity is provided with a through hole running through to the other end face of the displacement detection ring mounting block, and the retaining ring is pressed on the displacement detection ring and the displacement detection ring is limited and fixed at a bottom of the cavity via screws.

3. A vibration table, wherein the vibration table is mounted with the device for measuring and protecting a horizontal slide table displacement according to claim 1.

4. The vibration table according to claim 3, wherein the vibration table is provided with a horizontal slide table, and the horizontal slide table is a T-shaped guide rail slide table or a V-shaped guide rail slide table or a self-lubricating guide rail slide table.

5. The vibration table according to claim 4, wherein the horizontal slide table is the T-shaped guide rail slide table, the device for measuring and protecting a horizontal slide table displacement is mounted on an end face of the T-shaped guide rail slide table.

6. The vibration table according to claim 4, wherein the horizontal slide table is the T-shaped guide rail slide table, the device for measuring and protecting a horizontal slide table displacement is mounted on a side surface of the T-shaped guide rail slide table.

7. The vibration table according to claim 4, wherein the horizontal slide table is the V-shaped guide rail slide table, the device for measuring and protecting a horizontal slide table displacement is mounted on an end face of the V-shaped guide rail slide table.

8. The vibration table according to claim 4, wherein the horizontal slide table is the V-shaped guide rail slide table, the device for measuring and protecting a horizontal slide table displacement is mounted on a side surface of the V-shaped guide rail slide table.

9. The vibration table according to claim 4, wherein the horizontal slide table is the self-lubricating guide rail slide table, the device for measuring and protecting a horizontal slide table displacement is mounted under a table top of the self-lubricating guide rail slide table.

* * * * *